US009432542B2

(12) United States Patent
Yoon et al.

(10) Patent No.: US 9,432,542 B2
(45) Date of Patent: Aug. 30, 2016

(54) IMAGE FORMING APPARATUS AND METHOD OF CONTROLLING POWER-SAVING MODE OF IMAGE FORMING APPARATUS

(71) Applicant: SAMSUNG ELECTRONICS CO., LTD., Suwon-si, Gyeonggi-do (KR)

(72) Inventors: Yong Bin Yoon, Yongin-si (KR); Chang Hwan Kim, Hwaseong-si (KR)

(73) Assignee: SAMSUNG ELECTRONICS CO., LTD., Suwon-Si (KR)

(*) Notice: Subject to any disclaimer, the term of this patent is extended or adjusted under 35 U.S.C. 154(b) by 0 days.

(21) Appl. No.: 14/302,849

(22) Filed: Jun. 12, 2014

(65) Prior Publication Data
US 2014/0368856 A1 Dec. 18, 2014

(30) Foreign Application Priority Data
Jun. 12, 2013 (KR) .................. 10-2013-0067061

(51) Int. Cl.
G06F 1/32 (2006.01)
H04N 1/00 (2006.01)
(Continued)

(52) U.S. Cl.
CPC ........ H04N 1/00896 (2013.01); G06F 1/3206 (2013.01); G06F 1/3284 (2013.01);
(Continued)

(58) Field of Classification Search
CPC ..................... H04N 1/00885; H04N 1/00891; H04N 1/00896; H04N 1/00899; H04N 1/00904; H04N 1/00928; H04N 1/00954; H04N 1/32609; H04N 1/32625; H04N 1/3263; H04N 1/32635; B41J 29/393; G06K 15/4055; G03G 15/5004; G06F 1/3215; G06F 1/325; G06F 1/3284; G06F 1/3287; G06F 1/3293; G06F 1/3296; G06F 3/12221; G06F 3/1229; G06F 3/1285; Y02B 60/1267; Y02B 60/1271

USPC ................ 358/1.1, 1.9, 2.1, 1.11–1.18, 296; 713/300, 310, 320–324, 330, 340; 399/9–37, 88
See application file for complete search history.

(56) References Cited

U.S. PATENT DOCUMENTS 5,479,240 A * 12/1995 Lee ........................ G03G 15/55
399/21
5,652,950 A 7/1997 Kim
(Continued)

FOREIGN PATENT DOCUMENTS

JP 2012-146169 8/2012
JP 2013-111862 6/2013
KR 10135453 12/1996

OTHER PUBLICATIONS

International Search Report mailed Sep. 19, 2014 in related International Application No. PCT/KR2014/005164.
(Continued)

Primary Examiner — Chad Dickerson
(74) Attorney, Agent, or Firm — Staas & Halsey LLP

(57) ABSTRACT

An image forming apparatus and a method of controlling power-saving modes of the image forming apparatus are provided. The method of controlling power-saving modes of the image forming apparatus includes beginning a first power-saving mode after standing by in a normal mode for first time if no print operation is implemented, and beginning a second power-saving mode after standing by in the normal mode for second standby time if an error occurs under implementation of a print operation, wherein the second time is shorter than the first time, and the second power-saving mode includes a an error-checking mode.

24 Claims, 11 Drawing Sheets

(51) Int. Cl.
*G06K 15/00* (2006.01)
*G06F 3/12* (2006.01)

(52) U.S. Cl.
CPC ... *G06K15/4055* (2013.01); *H04N 2201/0091* (2013.01); *H04N 2201/0094* (2013.01); *Y02B 60/1267* (2013.01)

(56) References Cited

U.S. PATENT DOCUMENTS

| | | |
|---|---|---|
| 2004/0227970 A1 | 11/2004 | Ohara |
| 2005/0240788 A1 | 10/2005 | Satoh |
| 2008/0075498 A1 | 3/2008 | Kojo |
| 2008/0114996 A1* | 5/2008 | Suzuki ............... G03G 15/5004 713/320 |
| 2008/0198397 A1* | 8/2008 | Watanabe ............. G06F 1/3203 358/1.14 |
| 2009/0051958 A1* | 2/2009 | Ito ..................... G03G 15/5004 358/1.14 |
| 2011/0314311 A1 | 12/2011 | Maeda |
| 2013/0010330 A1* | 1/2013 | Toshihiro ........... G03G 15/5087 358/1.15 |

OTHER PUBLICATIONS

Partial European Search Report dated May 20, 2015 in European Application No. 14172194.4. (six pages).

* cited by examiner

FIG. 4

| CTRL ITEM | P0 | P0 OFF | Pe | P1 | P2 |
|---|---|---|---|---|---|
| 24V ELECTRICAL ELEMENT | ON | OFF | OFF | OFF | OFF |
| IO_SET | ACTIVE | INACTIVE | INACTIVE | INACTIVE | INACTIVE |
| ENGINE | ACTIVE | HALF ACTIVE | HALF ACTIVE | INACTIVE | INACTIVE |
| CPU | FULL ACTIVE | FULL ACTIVE | HALF ACTIVE | HALF ACTIVE | MICRO KERNEL |
| NETWORK | 100Mbps | 100Mbps | 10Mbps | 10Mbps | 10Mbps |
| PAD OFF | 5% | 5% | ERROR BLOCK EXEMPLITION | 5% | 80% |
| PS VOLTAGE | ON | ON | ON | OFF | OFF |
| LCD | ON | ON(ERROR)/OFF | ON | OFF | OFF |
| MICOM | ENABLE | ENABLE | ENABLE/RESET | RESET | RESET |
| MEMORY | ACTIVE | ACTIVE | ACTIVE | ACTIVE | SELFREFRESH |
| DC/DC | NORMAL | NORMAL | NORMAL | NORMAL | LOW MODE |

IMAGE FORMING APPARATUS AND METHOD OF CONTROLLING POWER-SAVING MODE OF IMAGE FORMING APPARATUS

CROSS-REFERENCE TO RELATED APPLICATIONS

This application is related to, and claims the priority benefit of, Korean Patent Applications No. 10-2013-0067061, filed on Jun. 12, 2013 in the Korean Intellectual Property Office, the disclosure of which is incorporated herein by reference.

BACKGROUND

1. Field

Embodiments relate to an image forming apparatus and control of power-saving modes of an image forming apparatus.

2. Description of the Related Art

Image forming apparatuses, such as copiers, printers, and devices combining functions thereof, may begin in a power-saving mode (e.g., a sleep mode) within a predetermined time, to satisfy power-saving standards if a certain time has passed in a state in which the apparatus is not used by a user. Upon occurrence of an error that the user may resolve, such as a paper-jam, paper-empty, toner-replacement, cover-opening, etc., image forming apparatuses may maintain a normal standby mode to allow a user to deal with the error without beginning the power-saving mode. Alternatively, image forming apparatuses may begin the power-saving mode regardless of the error.

If a power-saving mode is not begun upon occurrence of an error, satisfying power-saving standards may be difficult. In a case of managing a power-saving mode in which at least a part, e.g., a large part of the image forming apparatus is inactivated, printout time of a first sheet may be increased, for example, because warming-up, almost similar to a rebooting, may be necessary upon occurrence of a wakeup situation, which may cause user dissatisfaction. Managing the power-saving mode regardless of an error, even after the error has occurred, may prevent the user from recognizing occurrence of the error or efficiently dealing with the error.

SUMMARY

It is an aspect of an embodiment to appropriately manage a plurality of power-saving modes providing different power-saving effects in consideration of a situation.

It is an aspect of an embodiment to manage a power-saving mode upon occurrence of an error in consideration of display of the error as well as resolution to the error.

It is an aspect of an embodiment to prevent frequent warming-up depending on frequent wakeup.

Additional aspects are set forth in part in the description which follows and, in part, are be obvious from the description, or may be learned by practice of the invention.

In accordance with an aspect of an embodiment, a method of controlling power-saving modes of an image forming apparatus includes beginning a first power-saving mode after standing by in a normal mode for first time if no print operation is implemented, and beginning a second power-saving mode after standing by in the normal mode for second time if an error occurs under implementation of a print operation, wherein the second time is shorter than the first time, and the second power-saving mode includes an error-checking mode.

In an exemplary method of controlling power-saving modes of the image forming apparatus, the first power-saving mode may include a plurality of power-saving modes having different power-saving efficiencies.

In an exemplary method of controlling power-saving modes of the image forming apparatus, the plurality of power-saving modes may sequentially begin starting from a lower power-saving efficiency.

In an exemplary method of controlling power-saving modes of the image forming apparatus, the second power-saving mode may include a plurality of power-saving modes having different power-saving efficiencies, in addition to the error-checking mode.

In an exemplary method of controlling power-saving modes of the image forming apparatus, the error-checking mode and the plurality of power-saving modes may sequentially begin starting from a lower power-saving efficiency.

In an exemplary method of controlling power-saving modes of the image forming apparatus, the first time may be determined by user setting.

In an exemplary method of controlling power-saving modes of the image forming apparatus, the second time may be acquired by reducing the first time by a preset rate.

In an exemplary method of controlling power-saving modes of the image forming apparatus, the second time may be one third the first time.

In an exemplary method of controlling power-saving modes of the image forming apparatus, the image forming apparatus may be switched to a state in which the error is checkable and information regarding the error is displayable the error-checking mode.

In an exemplary method of controlling power-saving modes of the image forming apparatus, performance of a Central Processing Unit (CPU) of the image forming apparatus may be partially activated to check the error in the error-checking mode.

In an exemplary method of controlling power-saving modes of the image forming apparatus, a display unit may be activated to display information regarding the error in the error-checking mode.

In an exemplary method of controlling power-saving modes of the image forming apparatus, among input/output pads of the CPU of the image forming apparatus, other input/output pads except for an input/output pad related to a constituent element at which the error occurs may be turned off in the error-checking mode.

In accordance with another aspect of the invention, a method of controlling power-saving modes of an image forming apparatus includes sequentially beginning a plurality of power-saving modes having different power-saving efficiencies starting from a lower power-saving efficiency after standing by in a normal mode for first standby time if a print operation is implemented, and sequentially beginning a plurality of power-saving modes having different power-saving efficiencies starting from a lower power-saving efficiency after standing by in the normal mode for second time if an error occurs under implementation of the print operation, wherein the second time is shorter than the first time, and the plurality of power-saving modes includes a an error-checking mode.

In an exemplary method of controlling power-saving modes of the image forming apparatus, the first time may be determined by user setting.

In an exemplary method of controlling power-saving modes of the image forming apparatus, the second time may be acquired by reducing the first time by a preset rate.

In an exemplary method of controlling power-saving modes of the image forming apparatus, the second time may be one third the first time.

In an exemplary method of controlling power-saving modes of the image forming apparatus, the image forming apparatus may be switched to a state in which the error is checkable and information regarding the error is displayable the error-checking mode.

In an exemplary method of controlling power-saving modes of the image forming apparatus, performance of a Central Processing Unit (CPU) of the image forming apparatus may be partially activated to check the error in the error-checking mode.

In an exemplary method of controlling power-saving modes of the image forming apparatus, a display unit may be activated to display information regarding the error in the error-checking mode.

In an exemplary method of controlling power-saving modes of the image forming apparatus, among input/output pads of the CPU of the image forming apparatus, other input/output pads except for an input/output pad related to a constituent element at which the error occurs may be turned off in the error-checking mode.

In accordance with an aspect of an embodiment, a method of controlling power-saving modes of an image forming apparatus includes sequentially beginning a plurality of power-saving modes having different power-saving efficiencies starting from a lower power-saving efficiency after standing by in a normal mode for first time if a print operation is implemented, and beginning a power-saving mode to switch the image forming apparatus to a state in which an error is checkable and information regarding the error is displayable after standing by in the normal mode for second time if the error occurs under implementation of the print operation, wherein the second time is shorter than the first time.

In an exemplary method of controlling power-saving modes of the image forming apparatus, a display unit may be activated to display information regarding the error in the power-saving mode.

In an exemplary method of controlling power-saving modes of the image forming apparatus, among input/output pads of the CPU of the image forming apparatus, other input/output pads except for an input/output pad related to a constituent element at which the error occurs may be turned off in the power-saving mode.

In an exemplary method of controlling power-saving modes of the image forming apparatus, the first time may be determined by user setting.

In an exemplary method of controlling power-saving modes of the image forming apparatus, the second time may be acquired by reducing the first time by a preset rate.

In an exemplary method of controlling power-saving modes of the image forming apparatus, the second time may be one third the first time.

In accordance with an aspect of an embodiment, a method of controlling power-saving modes of an image forming apparatus, includes beginning a power-saving mode after standing by in a normal mode for first time if no print operation is implemented, and beginning another power-saving mode after standing by in the normal mode for second time if an error occurs under implementation of a print operation, wherein the second time is shorter than the first time.

In an exemplary method of controlling power-saving modes of the image forming apparatus, the first time may be determined by user setting.

In an exemplary method of controlling power-saving modes of the image forming apparatus, the second time may be acquired by reducing the first time by a preset rate.

In an exemplary method of controlling power-saving modes of the image forming apparatus, the second time may be one third the first time.

In accordance with an aspect of the invention, an image forming apparatus includes an engine configured to form an image, a display unit, and a controller, wherein if the engine encounters an error, the controller switches the image forming apparatus to a state in which the error is checkable and information regarding the error is displayable when preset time has passed after occurrence of the error, and the controller controls the display unit to display information regarding the error.

In an image forming apparatus, a controller may activate the display unit to display information regarding the error in an error-checking mode.

In an image forming apparatus, a controller may turn off other input/output pads except for an input/output pad related to a constituent element at which the error occurs among input/output pads of the CPU of the image forming apparatus in an error-checking mode.

BRIEF DESCRIPTION OF THE DRAWINGS

These and/or other aspects of the embodiments will become apparent and more readily appreciated from the following description of the embodiments, taken in conjunction with the accompanying drawings of which:

FIG. 4 illustrates a classification of power-saving modes of an image forming apparatus according to an embodiment;

DETAILED DESCRIPTION

Figure 1:
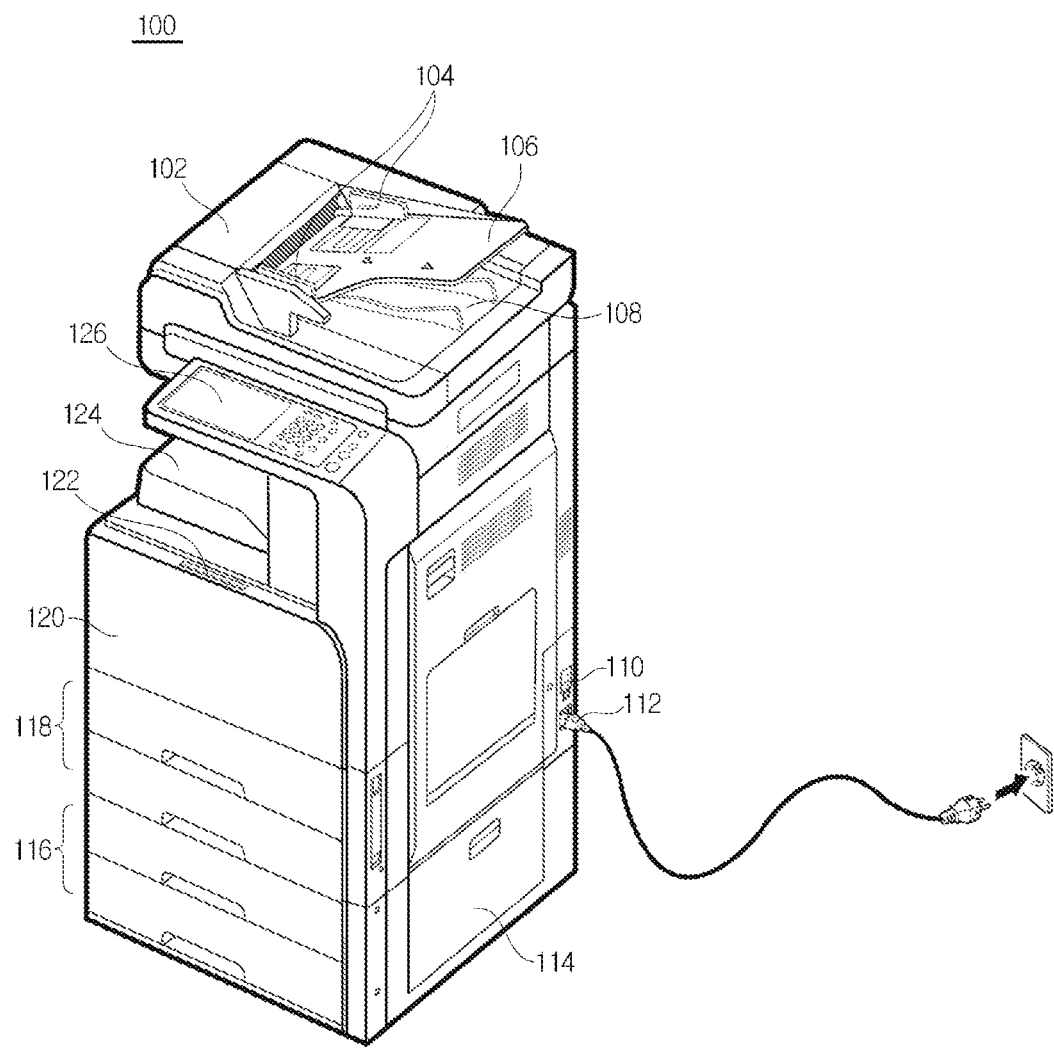
FIG. 1 illustrates an image forming apparatus according to an embodiment.

Reference will now be made in detail to the embodiments, examples of which are illustrated in the accompanying drawings, wherein like reference numerals refer to like elements throughout.

FIG. 1 illustrates an image forming apparatus according to an embodiment. As exemplarily illustrated in FIG. 1, the image forming apparatus 100 according to the embodiment has an external configuration as follows.

An automatic document feeder 102 may be provided on top of the image forming apparatus 100. The automatic document feeder 102 is a device that may be added via selection of an option, and may be removed from the image forming apparatus 100. The automatic document feeder 102 may feed a number of documents to the image forming apparatus 100 one by one. According to an embodiment, upon scanning/copying/transmitting (faxing) a number of documents, feeding the documents using the automatic document feeder 102 enables rapid feed of the number of documents to the image forming apparatus 100 within a short time. The automatic document feeder 102 includes document-width guides 104, a document feed tray 106, and a document output tray 108. The document-width guides 104 guide a document to be fed, for example, at both lateral sides of the document (on the basis of a main scan direction) to allow the document to be fed into the image forming apparatus 100 in a designated direction while maintaining a constant attitude. The document feed tray 106 serves to receive the document to be fed into the image forming apparatus 100. The document received in the document feed tray 106 may be fed into the image forming apparatus 100 via operation of a document pickup member, a roller, and the like. The document output tray 108 serves to receive a document discharged from the image forming apparatus 100 after the document fed from the document feed tray 106 into the image forming apparatus 100, for example, is subjected to scanning within the image forming apparatus 100.

The image forming apparatus 100 may be provided at a surface thereof with a power switch 110. The power switch 110 allows, for example, commercial AC power of 110 V or 220 V, supplied through a power cord 112, to be converted in terms of phase/voltage/frequency via a power supply unit of the image forming apparatus 100, and then be supplied to electrical elements of the image forming apparatus 100.

A second cassette feeder 116 may be provided at a side, e.g., a lateral side thereof with a second cassette feeder cover 114. The image forming apparatus 100 includes a standard cassette feeder 118 that may be basically provided for document reception. The second cassette feeder 116 may be selectively added to the image forming apparatus 100. The second cassette feeder 116 as well as the standard cassette feeder 118 provide a remarkably increased reception capacity of documents.

A cover, e.g., front cover 120 may be provided at a surface, e.g., front surface of the image forming apparatus 100. The front cover 120 may be openable for maintenance/repair of internal units, such as a laser scanning unit, waste toner vessel, toner cartridge, imaging unit, etc. The front cover 120 may be opened using a front cover grip 122.

A paper output tray 124 serves to receive paper discharged from the image forming apparatus 100 after an image is formed on paper fed into the image forming apparatus 100.

A User Interface (UI) 126 includes a display unit, a status display Light Emitting Diode (LED), and a key input unit. The key input unit includes, for example, plural numeral buttons, function buttons, menu buttons, and instruction buttons.

Figure 2:
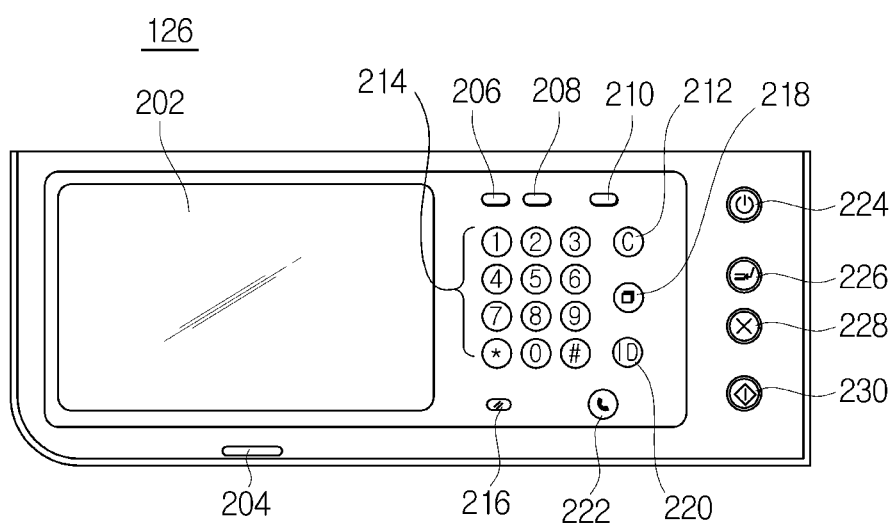
FIG. 2 illustrates a user interface of an image forming apparatus according to an embodiment.

FIG. 2 illustrates a UI of an image forming apparatus according to an embodiment. As exemplarily illustrated in FIG. 2, the UI 126 of the image forming apparatus according to an embodiment includes a display unit 202, a status display LED 204, an operating status button 206, a counter button 208, an eco button 210, a delete button 212, numeral buttons 214, a function-return button 216, a redial/pause button 218, a log-in/log-out button 220, an onhook dial button 222, a power button 224, an urgent-copy button 226, a stop button 228, and a start button 230.

The display unit 202 may display a status, e.g., current status of the image forming apparatus 100, and may display a screen that requests a user response during operation. The display unit 202 may have a menu setting function.

The status display LED 204 may display a current status of the image forming apparatus 100, for example, via a color change and flickering. A difference between the display unit 202 and the status display LED 204 is that the display unit 202 may display detailed status information and allow bidirectional communication with a user, whereas the status display LED 204 may display a status of the image forming apparatus 100 in a simplified unilateral manner via a color change and flickering.

The operating status button 206 may be operated, for example, pushed by the user to display, for example, an operation that is being executed in the image forming apparatus 100, a standby operation, a completed operation, an error code upon occurrence of an error, or a security operation on the display unit 202.

The counter button 208 may be operated, for example, pushed by the user to display the number of accumulated sheets in the image forming apparatus 100.

The eco button 210 may be operated, for example, pushed by the user to cause the image forming apparatus 100 to forcibly begin a power-saving mode (eco mode) to reduce energy consumed by the image forming apparatus 100.

The delete button 212 may be operated, for example, pushed by the user to delete characters/numerals/symbols in an edit region. According to an embodiment, if the user incorrectly inputs the number of sheets to be copied, the delete button 212 may be used to correct the erroneous input. If the user inputs incorrect fax numbers for fax transmission, the delete button 212 may be used to correct the erroneous input.

The numeral buttons 214 may be used to allow the user to input phone/fax numbers, or to input other numerals and characters. The number of sheets to be printed, or numerals related to other options may be input using the numeral buttons 214.

The function-return button 216 may be operated, for example, pushed by the user to initialize current settings of the image forming apparatus 100. According to an embodiment, if the function-return button 216 is pushed in a state in which a copy menu has been selected and the number of sheets to be copied or the concentration of toner have been set, the number of sheets to be copied may be initialized to zero, and the concentration of toner may be initialized, for example, to a middle value.

The redial/pause button 218 may be operated, for example, pushed by the user to redial recently transmitted or received fax numbers in a standby mode, or to insert a pause symbol (-) in an edit mode.

The log-in/log-out button 220 may be operated, for example, pushed by the user to log in or log out of the image forming apparatus 100.

The onhook dial button 222 may be operated, for example, pushed by the user to generate a dial tone.

The power button 224 may be operated, for example, used to power the image forming apparatus 100 on or off. If the status display LED 204, for example, is switched to emit blue light, this may indicate that the image forming apparatus is in a powered-on state. The power button 224 may need to be, for example, pushed for a certain time, e.g., 3 seconds or more to power the image forming apparatus 100 off.

The urgent-copy button 226 may be operated, for example, pushed to stop a current operation that is being executed to begin a urgent copy operation.

The stop button 228 may be operated, for example, pushed by the user to stop a current operation that is being executed by the image forming apparatus 100. The display unit 202 may display a pop-up window that shows, for example, a current operation to allow the user to select whether to stop the current operation or to resume another operation.

The start button 230 may be operated, for example, pushed by the user to start a currently set operation.

Figure 3:
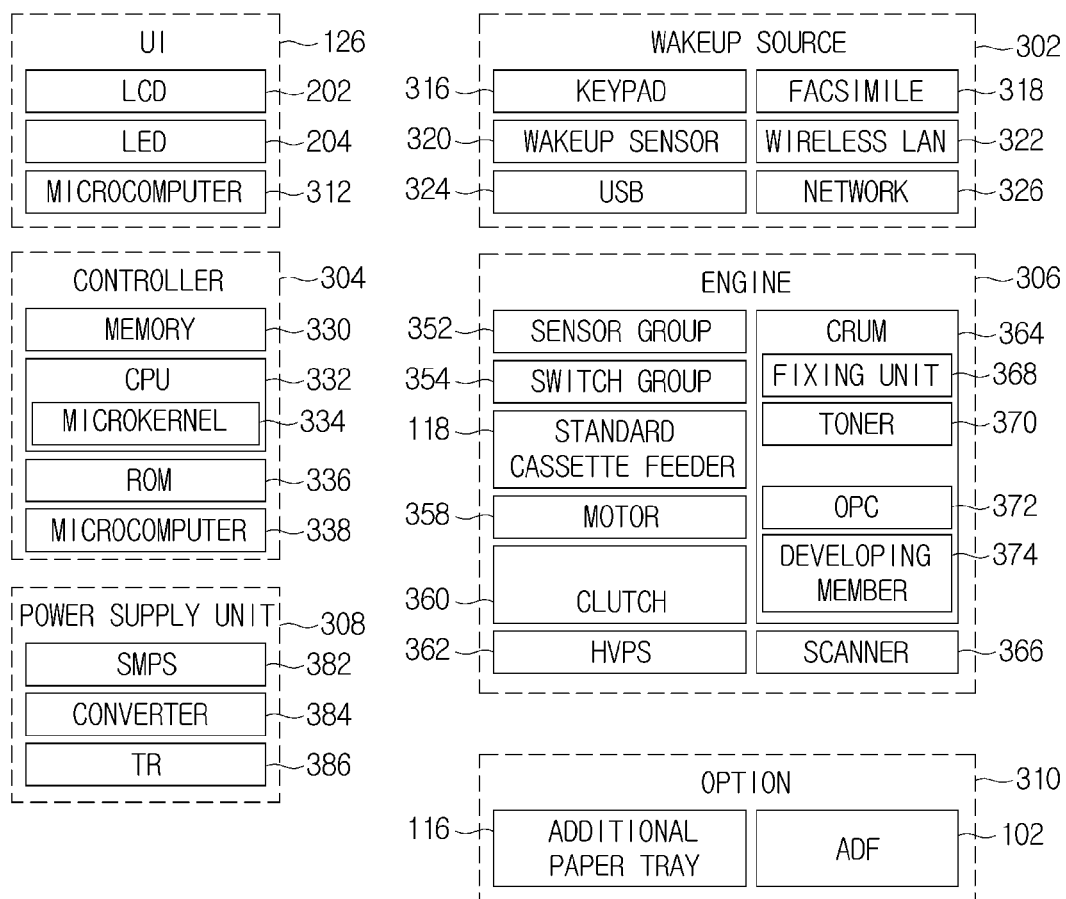
FIG. 3 illustrates a control system of an image forming apparatus according to an embodiment.

FIG. 3 illustrates a control system of an image forming apparatus according to an embodiment. As exemplarily illustrated in FIG. 3, the control system of the image forming apparatus 100 according to an embodiment includes the UI 126, a wakeup source 302, a controller 304, an engine 306, a power supply unit 308, and an option 310.

The UI 126, as described with reference to FIGS. 1 and 2, includes the display unit 202 and the status display LED 204. The UI 126 includes a microcomputer 312, for example, to control general operations of the UI 126.

The wakeup source 302 designates elements to generate an input by which the image forming apparatus 100 according to an embodiment wakes from a power-saving mode. According to an embodiment, if the log-in/log-out button 220 (see, for example, FIG. 2) is pushed in a power-saving mode of the image forming apparatus 100, the log-in/log-out button 220 (see, for example, FIG. 2) functions as a wakeup source to wake the image forming apparatus 100 from the power-saving mode. The wakeup source 302 includes a keypad 316, a facsimile 318, wakeup sensors 320, a wireless LAN 322, a USB 324, and a network 326.

The keypad 316 includes the operating status button 206, the counter button 208, the eco button 210, the delete button 212, the numeral buttons 214, the function-return button 216, the redial/pause button 218, the log-in/log-out button 220, the onhook dial button 222, the power button 224, the urgent-copy button 226, the stop button 228, and the start button 230 among constituent elements of the UI 126 of the image forming apparatus 100 as described with reference to FIG. 2.

The facsimile 318 is a device that transmits an image of a document scanned by the image forming apparatus 100 to a receiver through a telephone circuit, or stores and outputs an image received from an external transmitter. The image forming apparatus 100 may be connected to a telephone circuit.

Some of the several elements of the image forming apparatus 100 may function as a wakeup source, but may not generate electrical signals during operation. According to an embodiment, opening/closing of the second cassette feeder cover 114, opening/closing of the front cover 120, paper feed by the automatic document feeder 102, and opening/closing of a flat panel cover for document scan may sufficiently act as a wakeup source, but no electrical signal may be generated with regard to the respective operation. Accordingly, the wakeup sensors 320 may be mounted at positions to sense opening/closing of the second cassette feeder cover 114, opening/closing of the front cover 120, paper feed by the automatic document feeder 102, and opening/closing of a flat panel cover for document scan. Occurrence of a wakeup situation at the corresponding positions may be recognized based on detected results of the wakeup sensors 320.

The wireless LAN 322 enables wireless communication between the image forming apparatus 100 and an external device, such as a laptop computer, a tablet PC, a smart-phone, etc. The wireless LAN 322 may use a communication method, such as wireless Internet using a relay, and a communication device, such as Bluetooth, Wi-Fi, etc.

The USB 324 is a device that allows an external storage device, such as a USB memory or hard disk, a laptop computer, a tablet PC, a smart-phone, etc. to communicate with the image forming apparatus 100 via USB communication. The image forming apparatus 100 may include a USB interface, and an external storage device, such as a USB memory or hard disk, a laptop computer, a tablet PC, a smart-phone, etc. may be connected to the image forming apparatus 100 via a USB cable. Attempts of external devices to access the image forming apparatus 100 via the USB 324 may be one of various wakeup sources of the image forming apparatus 100.

The network 326 may be a communication network to enable communication between the image forming apparatus 100 and a plurality of host computers when plural users share a single image forming apparatus 100 via the plurality of host computers, for example, in business spaces, such as offices. Differently from the wireless LAN 322 or the USB 324, each of the plurality of host computers may require an IP address, for example, previously allotted thereto. An attempt of each of the plurality of host computers connected to the image forming apparatus 100 via the network 326 to use the image forming apparatus 100 may be one of various wakeup sources of the image forming apparatus 100.

The controller 304 serves to control general operations of the image forming apparatus 100. The controller 304 of the image forming apparatus 100 according to the embodiment includes a memory 330, a Central Processing Unit (CPU) 332, a Read Only Memory (ROM) 336, and a microcomputer 338.

The memory 330 includes a Double Data Rate Random Access Memory (DDR RAM).

The CPU 332 is a System On Chip (SOC) type dual core CPU. One of two cores may process video signals and the other core may control the engine 306. The CPU 332 may be equipped with a microkernel 334 that may be software for setting of environments required to drive a system and scheduling of programs.

The ROM 336 may be a main memory device managed by the CPU 332. Software, firmware, etc. required to control the image forming apparatus 100 may be recorded and stored in the ROM 336.

The microcomputer 338 may be an additional device to assist the CPU 322.

The engine 306 included in the image forming apparatus 100 may designate elements that participate in a series of processes of supplying paper (or documents) and discharging the paper subjected to image processing. The engine 306 of the image forming apparatus 100 according to an embodiment includes a sensor group 352, a switch group 354, the standard cassette feeder 118, a motor 358, a clutch 360, a High Voltage Power Supply (HVPS) 362, a Customer Replacement Unit Monitor (CRUM) 364, and a scanner 366. Other elements may be included in the engine 306.

The sensor group 352 is a generic term of elements to detect, for example, variation of various electrical/mechanical situations occurring in the image forming apparatus 100. The sensor group 352 may include wakeup sensors 320.

The switch group 354 includes the power switch 110 as illustrated, for example, in FIG. 1, and designates various switches that participate in internal power and signal transmission of the image forming apparatus 100. The switch group 354 may include relays or high-power semiconductor switches, and various other forms of switches.

The standard cassette feeder 118 may be provided in the image forming apparatus 100 for paper reception as described, for example, with reference to FIG. 1.

The motor 358 included in the image forming apparatus 100 may rotate an optical photoconductive (OPC) drum and a plurality of rollers that directly participate in image formation. In general, a plurality of drive gears may be connected to the single motor 358, and in turn the OPC drum or the plurality of rollers may be mechanically connected in a rotatable manner to the gears.

The clutch 360 may control connection between the motor 358 and the plurality of drive gears. That is, the clutch 360 may selectively allow or prevent transmission of drive power from the motor 358 to the drive gears. Since the motor 358 may require great power and time to start rotation from a stationary state, it may be possible to prevent power transmission to the drive gears even while the motor 358 is being rotated by controlling only the clutch 360 for a relatively short time rather than stopping the motor 358.

The HVPS 362 may instantaneously convert, for example, a low voltage into a high voltaged, e.g. a low voltage of 24V into several thousand volts to tens of thousands of volts to supply the converted voltage to the OPC drum. The high voltage supplied from the HVPS 362 may cause a high-voltage discharge at the OPC drum.

The CRUM 364 includes a fixing unit 368, a toner 370, an OPC drum 372, and a developing member 374. The fixing unit 368, the toner 370, the OPC drum 372, and the developing member 374 may form an image, scanned from a document or transmitted from an external source, on paper, and may be replaced by the user when lifespan thereof expires.

The scanner 366 may generate an image via document scan. In the image forming apparatus 100 as exemplarily illustrated in FIG. 1, a flat glass panel appears when the automatic document feeder 102 is lifted. The scanner 366 may be located below the glass panel to scan a document placed on the glass panel to thereby generate an image.

The power supply unit 308 includes a Switching Mode Power Supply (SMPS) 382, a converter 384, and a transistor 386, for example. The power supply unit 308 implements conversion, for example, of 110V or 220V commercial AC power in terms of phase/voltage/frequency to supply the power to respective electrical elements of the image forming apparatus 100.

The option 310 may be additionally mounted, and includes the automatic document feeder 102 and the second cassette feeder 116.

FIG. 4 illustrates classification of power-saving modes of an image forming apparatus according to an embodiment. With regard to the image forming apparatus 100 according to an embodiment, power-saving modes to satisfy power-saving standards via reduction of power consumption may be classified in various ways as exemplarily illustrated in FIG. 4, such that a power-saving mode suitable for the status of the image forming apparatus 100 may be selected and managed. In FIG. 4, control items may be switchable from a power-saving mode into a status for power saving.

As exemplarily illustrated in FIG. 4, power-saving modes of the image forming apparatus 100 according to an embodiment include <P0 mode>, <P0 OFF mode>, <Pe mode>, <P1 mode>, and <P2 mode>. Control items that may be activated/inactivated in each power-saving mode include <24V Electrical Elements>, <IO_SET>, <Engine>, <CPU>, <Network>, <PAD OFF>, <PS Voltage>, <LCD>, <MICOM>, <Memory>, and <DC/DC>.

<24V Electrical Elements> include electrical elements that are operated upon receiving 24V power. For example, in <24V Electrical Elements>, "ON" is a control state to supply 24V power to corresponding electrical elements, and "OFF" is a control state to prevent 24V power from being transmitted to the corresponding electrical elements.

<IO_SET> includes input/output terminals of the CPU 332. The input/output terminals of the CPU 332 generate activation signals at a low level and inactivation signals at a high level. For example, in <IO_SET>, "ACTIVE" is a control state to allow the corresponding input/output terminals to generate high-level or low-level signals, and "INACTIVE" is a control state to electrically open the corresponding input/output terminals to completely prevent generation of high-level or low-level signals. Power may be consumed in the "ACTIVE" state although the quantity of power may be small, power consumption does not occur in the "INACTIVE" state because the input/output terminals are electrically open.

<Engine> includes constituent elements of the engine 306 described with respect to FIG. 3. Control states of <Engine> may be classified into "ACTIVE", "HALF-ACTIVE", and "INACTIVE". "ACTIVE" is a control state to activate all of the constituent elements of the engine 306. "HALF ACTIVE" is a control state to inactivate only the 24V electrical elements and an input/output interface for driving of the 24V electrical elements and activate the other constituent elements of the engine 306. "INACTIVE" is a control state to inactivate all of the constituent elements of the engine 306.

<CPU> includes constituent elements of the CPU 332 described with respect to FIG. 3. Control states of <CPU> may be classified into "FULL ACTIVE", "HALF ACTIVE", and "MICRO KERNEL". "FULL ACTIVE" is a control state to activate the CPU 332 to achieve maximum performance. "HALF ACTIVE" is a control state to reduce an operating frequency and a bus clock speed of the CPU 332 and activate input/output terminals of the engine 306, an input signal of which is checkable, and the microkernel 334. "MICRO KERNEL" is a control state to activate only the microkernel 334 and inactivate other functions of the CPU 332.

<NETWORK> includes elements related to the network 326 described with reference to FIG. 3. A representative constituent element of <NETWORK> may include a network interface card, and control states of <NETWORK> may be classified into "100 Mbps" and "10 Mbps". To reduce power consumption, a communication speed may be set to a high value of 100 Mbps in "100 Mbps" and a low value of 10 Mbps in "10 Mbps".

<PAD OFF> is a signal input/output pad that may be provided at a die equipped with the SOC type CPU 332. Control states of <PAD OFF> may be classified into "5%", "Error Block Exemption", and "80%". "5%" is a control state to inactivate all pads not used by a system. "Error Block Exemption" is a control state to inactivate pads, except for an input/output pad related to erroneous constituent elements of the image forming apparatus 100. "80%" is a control state to inactivate pads except for an input/output pad related to wakeup. Note that an input/output pad for control of electrical elements may be inactivated in the control state of "80%".

<PS voltage> is a power-saving voltage used for power saving, and is lower than a voltage that is used in a general operating mode. According to an embodiment, if, for example, 5V is used in a general operating mode, the power-saving voltage has a lower value, for example, of about 3.3V.

<LCD> includes the display unit 202 described with reference to FIG. 3. Control states of <LCD> may be classified into "ON", "OFF", and "ERROR ON". "ON" is a control state to turn on the display unit 202, and "OFF" is a control state to turn off the display unit 202. "ERROR ON" is a control state to turn on the display unit 202 only when error occurs and turn off the display unit 202 in a general power-saving mode.

<MICOM> includes the microcomputer 312 of the UI 126 described with reference to FIG. 3 or the microcomputer 338 of the controller 304. Control states of <MICOM> may be classified into "ENABLE", "RESET", and "ENABLE/RESET". "ENABLE" is a control state to maintain a corresponding microcomputer in a current active operating state, and "RESET" is a control state for initialization. Although power may be consumed in the "ENABLE" control state because the microcomputer is operated to control a corresponding constituent element, power consumption is relatively low in the "RESET" control state because the microcomputer is initialized and does not participate in control of a corresponding constituent element. "ENABLE/RESET" is a control state in which the "ENABLE" control state may be maintained only when a corresponding constituent element has encountered an error and the "ENABLE" control state may be switched to the "RESET" control state when the corresponding constituent element has not encountered an error.

<Memory> includes the memory 330 described with reference to FIG. 3. Control states of <Memory> may be classified into "ACTIVE" and "SELF REFRESH". "ACTIVE" is a control state to normally operate the memory 330, and "SELF REFRESH" is a control state to allow the memory 330, i.e. the DDR RAM to be self-refreshed for maintenance of data even in a low power mode.

<DC/DC> is a power supply structure to generate two kinds of DC voltages including a general DC voltage and a lower DC voltage. According to an embodiment, <DC/DC> may generate a general DC voltage of 5V and a lower DC voltage of 3.3V. Control states of <DC/DC> may be classified into "NORMAL" and "LOW MODE". "NORMAL" is an operating mode for implementation of normal DC/DC conversion, and "LOW MODE" is an operating mode for reduction of power consumption.

In the image forming apparatus 100 according to an embodiment, as exemplarily illustrated in FIG. 4, the control items may be selectively activated/inactivated on a per power-saving mode basis to enhance power-saving effects.

<P0 mode> is a standby mode in which all control items may be activated to enable normal print/copy/scan operations to implement a corresponding operation as soon as a corresponding operation instruction is generated. Accordingly, in <P0 mode>, all of the control items exemplarily illustrated in FIG. 4 may be activated.

<P0 OFF mode> is a power-saving mode in which some control items are inactivated or activated for power saving. For example, in <P0 OFF mode>, <24V Electrical Elements> are switched to the "OFF" state, <IO_SET> is switched to the "INACTIVE" state, and <Engine> is switched to the "HALF ACTIVE" state. In addition, <PAD OFF> is maintained in the "5%" control state to turn off unused blocks.

<Pe mode> is a power-saving mode to check an error when the image forming apparatus 100 encounters an error. For example, in <Pe mode>, <24V Electrical Elements> may be switched to the "OFF" state, <IO_SET> may be switched to the "INACTIVE" state, <Engine> may be switched to the "HALF ACTIVE" state, <CPU> may be switched to the "HALF ACTIVE" state, a speed of <Network> may be reduced to "10 Mbps", and <PAD OFF> may be switched to the "Error Block Exemption" state to turn off other blocks except for pads related to erroneous blocks. <Pe mode> is a power-saving mode to check an error. In <Pe mode>, the display unit 202 (for example, LCD" in FIG. 3) may be turned on to display error information. The error information includes error occurrence, error type, error resolution, and the like.

<P1 mode> is a power-saving mode exhibiting greater power-saving effects than that in <P0 OFF mode>. <Pe mode> may be implemented when an error occurs, whereas <P1 mode> may be implemented when no error occurs. For example, in <P1 mode>, <24V Electrical Elements> may be switched to the "OFF" state, <IO_SET> may be switched to the "INACTIVE" state, <Engine> may be switched to the "HALF ACTIVE" state, <CPU> may be switched to the "HALF ACTIVE" state, a speed of <Network> is reduced to "10 Mbps", <PAD OFF> is maintained in the "5%" state to turn off unused blocks, <PS Voltage> is switched to the "OFF" state, <LCD> is switched to the "OFF" state, and <MICOM> is switched to the "RESET" state. <P1 mode> corresponds to a sleep state, but the CPU 332 is internally in an active state.

<P2 mode> is a sleep mode (power-saving mode). In <P2 mode>, all control items may be switched to a control state for power saving. For example, in <P2 mode>, <24V Electrical Elements> are switched to the "OFF" state, <IO_SET> is switched to the "INACTIVE" state, <Engine> is switched to the "HALF ACTIVE" state, <CPU> is switched to the "MICRO KERNEL" state, a speed of <Network> is reduced to "10 Mbps", <PAD OFF> is switched to the "80%" state to turn off all other blocks except for wakeup sources, <PS voltage> is switched to the "OFF" state, <LCD> is switched to the "OFF" state, <MICOM> is switched to the "RESET" state, <Memory> is switched to the "SELF REFRESH" state, and <DC/DC> is switched to the "LOW MODE" state.

Figure 5A:
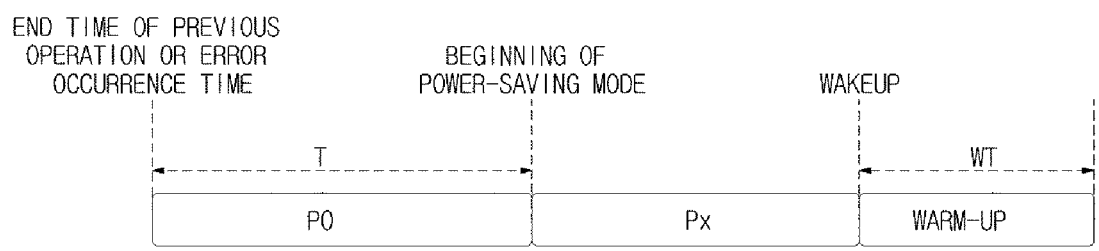
FIGS. 5A-5B illustrate a power-saving mode beginning sequence of an image forming apparatus according to an embodiment.
Figure 5B:
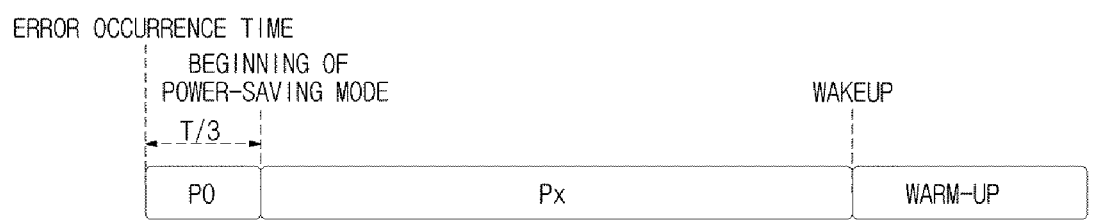

FIGS. 5A-5B illustrate a power-saving mode beginning sequence of an image forming apparatus according to an embodiment. FIG. 5A illustrates a power-saving mode beginning sequence in a case in which an error occurs or no error occurs when no operation instruction is generated. FIG. 5B illustrates a power-saving mode beginning sequence in the case in which an error occurs when an operation instruction is generated. For reference, if no error occurs when an operation instruction is generated, the operation instruction may be directly implemented without beginning a power-saving mode.

As exemplarily illustrated in FIG. 5A, in the case in which an error occurs or no error occurs when no operation instruction is generated, <P0 mode> is implemented (i.e. a standby mode is maintained) for a preset time T. A power-saving mode Px begins after the preset time T has passed. A preset time T for implementation of <P0 mode> may be set by the user. The power-saving mode Px is at least one power-saving mode among other power-saving modes described with reference to FIG. 4 except for <P0 mode>. If a wakeup situation occurs, for example, at any time during progress of the power-saving mode Px, the sequence may be returned to <P0 mode> after warm-up for a wakeup time WT. The wakeup time WT is time taken to return from the power-saving mode Px at the occurrence time of the wakeup situation to <P0 mode>, and is not artificially given. In FIG. 5A, <P0 mode> may refer to a normal mode, the preset time T may refer to a first standby time, and the power-saving mode Px may refer to a first power-saving mode.

As exemplarily illustrated in FIG. 5B, in a case in which an error occurs when an operation instruction is generated, <P0 mode> is implemented (i.e. a standby state is maintained) for a preset time T/3. A power-saving mode Px begins after the preset time T/3 has passed. The preset time T/3 for implementation of <P0 mode> corresponds to one third of the preset time T described with reference to FIG. 5A. Even if an operation instruction exists, the operation instruction may not be implemented under occurrence of an error. Therefore, reducing the implementation time of <P0 mode> (i.e. maintenance time of a standby state) to be one third may move up a beginning time of the power-saving mode Px, which enhance power-saving efficiency. Upon occurrence of an error, how rate of the time T set by the user will be reduced may vary according to preset conditions. According to an embodiment, the preset time T may be reduced to be a half, or one fifth. The power-saving mode Px is at least one power-saving mode among other power-saving modes described with reference to FIG. 4 except for <P0 mode>. Note that the power-saving mode Px of FIG. 5B may include <Pe mode> that is a power-saving mode to check an error. If a wakeup situation occurs at any time during progress of the power-saving mode Px, the sequence may be returned to <P0 mode> after warm-up for a wakeup time WT. The wakeup time WT is time taken to return from the power-saving mode Px at the occurrence time of the wakeup situation to <P0 mode>, and is not artificially given. In FIG. 5B, <P0 mode> may refer to a normal mode, the preset time T/3 may refer to a second standby time, and the power-saving mode Px may refer to a second power-saving mode.

Figure 6A:
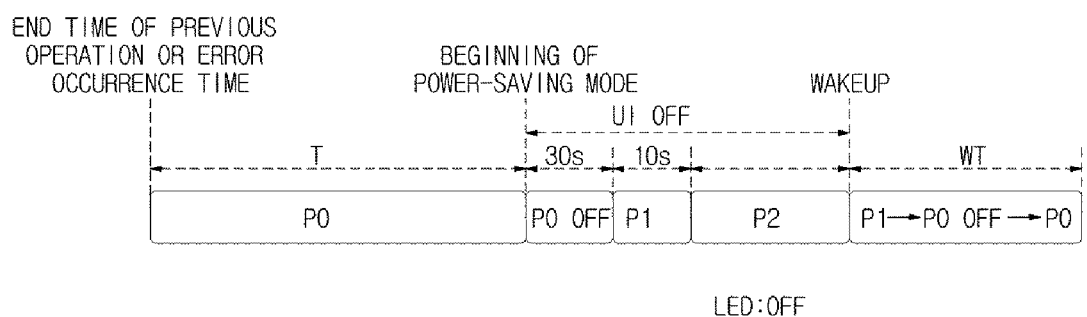
FIGS. 6A-6B illustrate a power-saving mode beginning sequence of an image forming apparatus according to an embodiment.
Figure 6B:
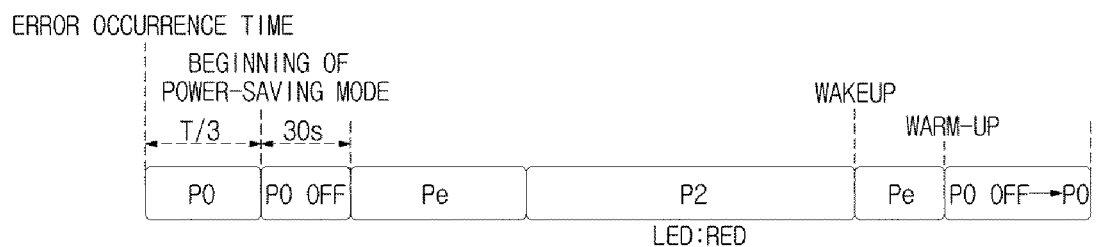

FIGS. 6A-6B illustrate a power-saving mode beginning sequence of the image forming apparatus according to an embodiment exemplarily illustrated in FIG. 5. FIG. 6A illustrates a power-saving mode beginning sequence in the case in which an error occurs or no error occurs when no operation instruction is generated. FIG. 6B illustrates a power-saving mode beginning sequence in the case in which an error occurs when an operation instruction is generated. For reference, if no error occurs when an operation instruction is generated, the operation instruction is directly implemented without beginning a power-saving mode.

As exemplarily illustrated in FIG. 6A, in a case in which an error occurs or no error occurs when no operation instruction is generated, <P0 mode> is implemented (i.e. a standby mode is maintained) for a preset time T. After the preset time T has passed, power-saving modes including <P0 OFF mode>, <P1 mode>, and <P2 mode> begin, for example, in stepwise fashion. <P0 OFF mode> is maintained, for example, for 30 seconds. A time of 30 seconds for maintenance of <P0 OFF mode> is time taken for the user to resolve an error after occurrence of the error, and may be set in sufficient consideration of time taken for the user to resolve a relatively simple general error. <P1 mode> is maintained, for example, for 10 seconds. A time of 10 seconds for maintenance of <P1 mode> is time taken to process packets/data in addition to printing via a network/USB upon beginning <P2 mode>. Thus, maintenance time of <P1 mode> may vary according to a data processing speed. The display unit 202 of the UI 126 is turned off during progress of <P0 OFF mode>. The status display LED 204 is turned off during maintenance of <P2 mode>. Note that beginning <P2 mode> may be unnecessary, and if a wakeup situation occurs at any time during progress of the power-saving mode, the sequence is returned to <P0 mode> after warm-up for a wakeup time WT. The wakeup time WT is time taken to return from the power-saving mode at the occurrence time of the wakeup situation to <P0 mode>, and is not artificially given. Warm-up is the power-saving mode beginning sequence in reverse. That is, if power-saving modes begin in the sequence of <P0 OFF mode>, <P1 mode>, and <P2 mode>, warm-up is implemented in the sequence of <P2 mode>, <P1 mode>, and <P0 OFF mode>. Alternatively, if power-saving modes begin in the sequence of <P0 OFF mode> and <P1 mode>, warm-up is implemented in the sequence of <P1 mode> and <P0 OFF mode>.

As exemplarily illustrated in FIG. 6B, in a case in which an error occurs when an operation instruction is generated, <P0 mode> is implemented (i.e. a standby mode is maintained) for a preset time T/3. After the preset time T/3 has passed, power-saving modes including <P0 OFF mode>, <P1 mode>, and <P2 mode> begin in stepwise fashion. <P0 OFF mode> is maintained for 30 seconds. The display unit 202 of the UI 126 is turned off during progress of the power saving mode. The status display LED 204 is turned on to emit red light so as to notify occurrence of an error during maintenance of <P2 mode>. Note that <P2 mode> may be unnecessary, and if a wakeup situation occurs at any time during progress of the power-saving mode, the sequence is returned to <P0 mode> after warm-up for a wakeup time WT. The wakeup time WT is time taken to return from the power-saving mode at the occurrence time of the wakeup situation to <P0 mode>, and is not artificially given. Warm-up upon occurrence of an error when an operation instruction is generated is implemented by returning to <Pe mode> for resolution of an error, and beginning super-ordinate power-saving modes, i.e. <P0 OFF mode> and <P2 mode> in sequence after the error is resolved.

In FIG. 6A, the reason why <P0 mode> is maintained for the preset long time T despite occurrence of an error is because frequent beginning of power-saving modes and frequent wakeup may deteriorate power-saving efficiency. In addition, beginning <P1 mode> instead of <Pe mode> that is a power saving mode in consideration of an error may further enhance power-saving efficiency. In FIG. 6B, even if an operation instruction exists, implementing the operation instruction may be difficult under occurrence of an error, and therefore beginning a power-saving mode within a shorter time may enhance power-saving efficiency. In addition, through provision of <Pe mode> for resolution of an error, the user or service technician may maintain the image forming apparatus 100 in a state to assist resolution of the error and achieve power-saving effects. The <Pe mode> may be included in a warm-up after the wakeup situation. This may assist the user or service technician in resolving an error immediately after wakeup by beginning <Pe mode> for resolution of the error simultaneously with wakeup.

As exemplarily illustrated in FIGS. 4 to 6B, the image forming apparatus 100 according to an embodiment may adopt a plurality of power-saving modes providing different power-saving efficiencies, and realize an appropriate power-saving mode according to the lapse of time during which the image forming apparatus 100 is not used, thereby reducing warm-up time under a wakeup situation after a short standby time. Realization of a power-saving mode in consideration of an error may assist the user in easily recognizing occurrence of an error and easily resolving the error. In addition, it may be possible to prevent frequent warm-up depending on frequent wakeup, resulting in enhanced power-saving efficiency and extended device lifespan.

Figure 7:
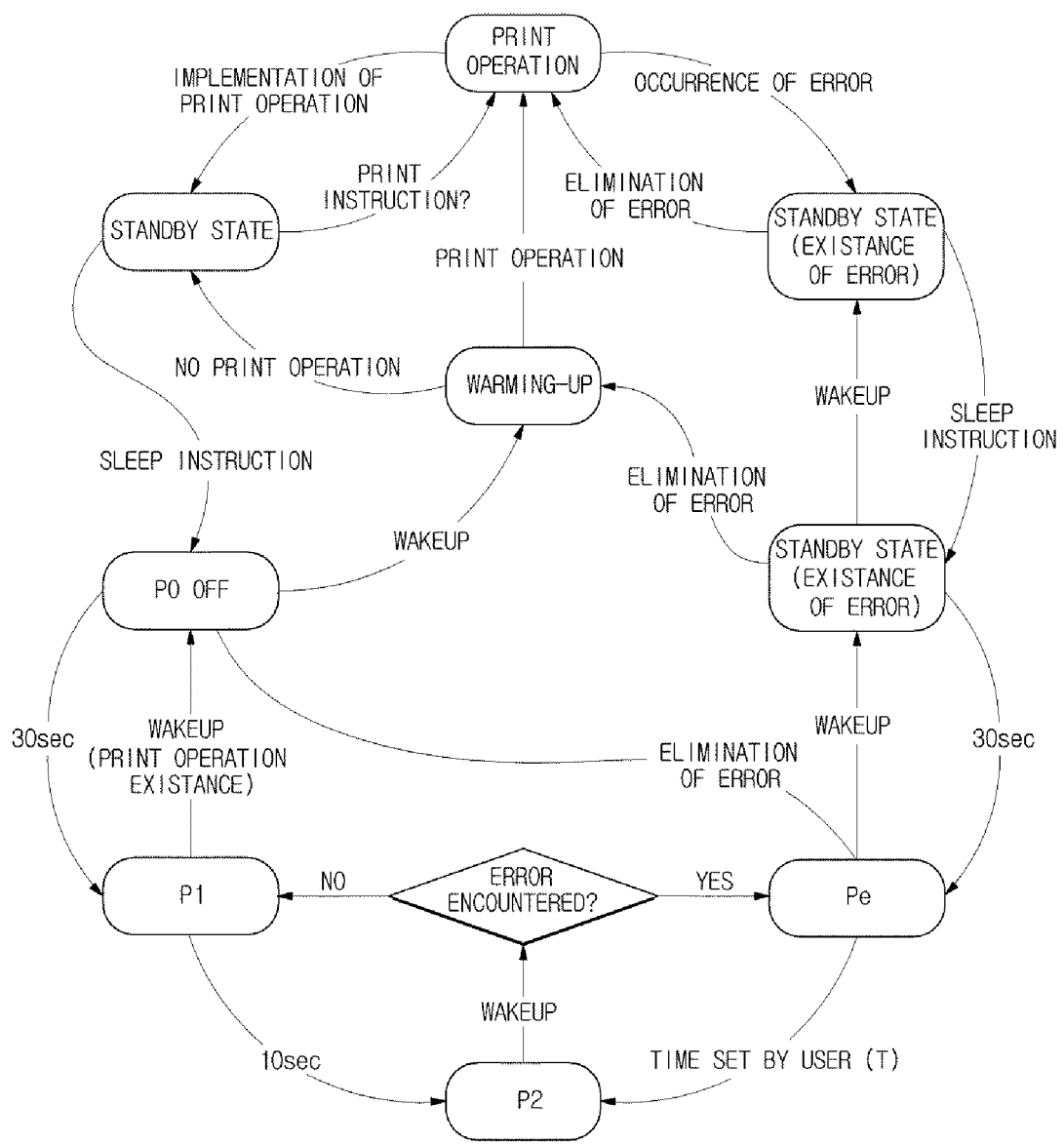
FIG. 7 illustrates a method of controlling power-saving modes of an image forming apparatus according to an embodiment.

FIG. 7 is a flowchart illustrating a method of controlling power-saving modes of an image forming apparatus according to an embodiment. FIG. 7 illustrates both a control method in a case in which an error occurs or no error occurs when no operation instruction is generated (see, for example, FIGS. 5A and 6A), and a control method in which an error occurs when an operation instruction is generated (see, for example, FIGS. 5B and 6B).

Figure 8:
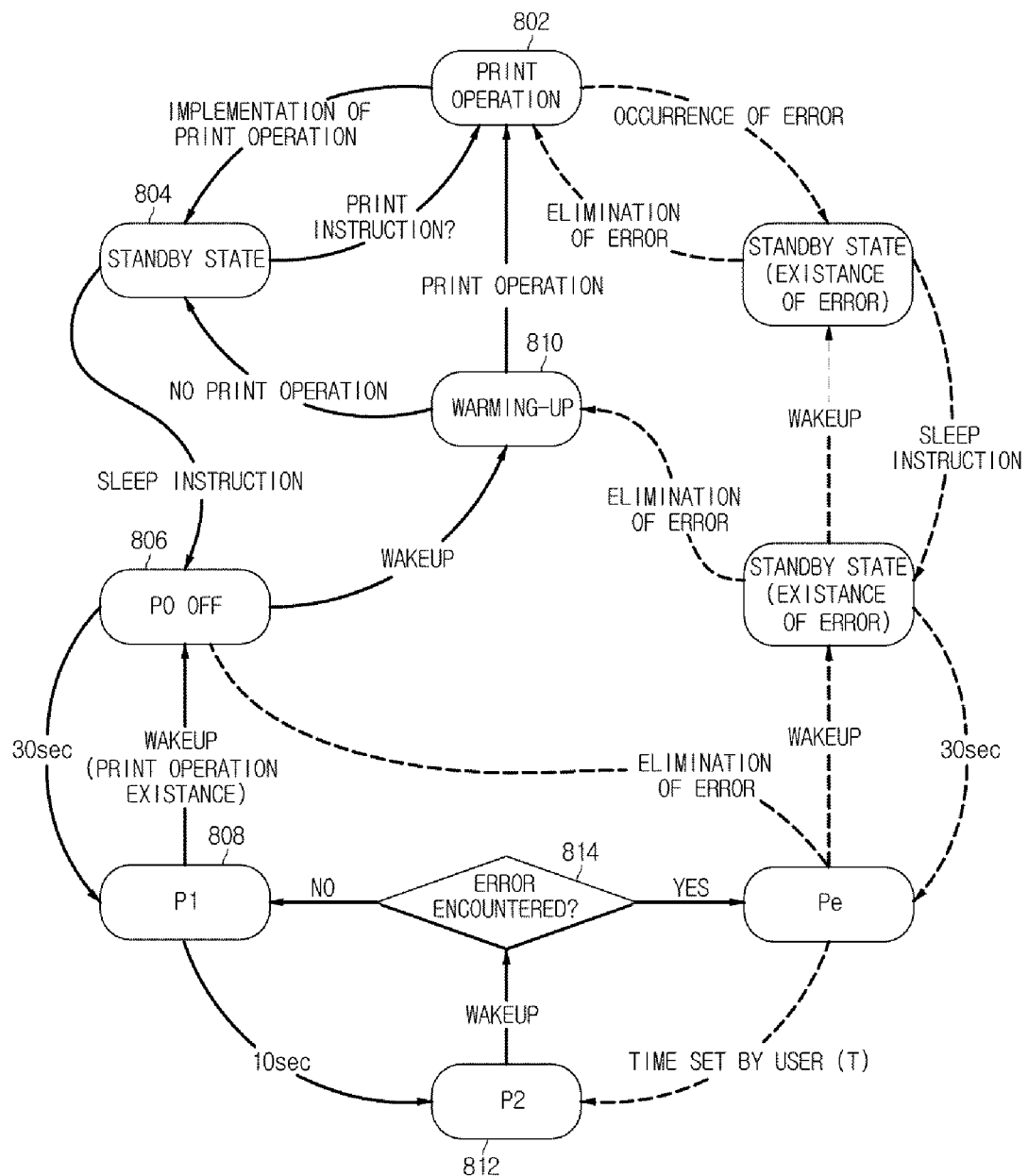
FIG. 8 illustrates a control method, distinguished by solid lines, in a case in which an error occurs before an operation instruction is generated or in which no error occurs.

FIG. 8 illustrates the control method of FIG. 7, distinguished by solid lines, in a case in which an error occurs or no error occurs when no operation instruction is generated. In FIG. 8, the control method in the case in which an error occurs when an operation instruction is generated is illustrated by a dashed lines. As exemplarily illustrated in FIG. 8 by a solid line, a print operation begins (operation 802), and <P0 mode> as a standby state (operation 804) begins after completion of the print operation. If a preset time T has passed after <P0 mode> begins, a sleep instruction is generated to begin <P0 OFF mode> as a power-saving mode (operation 806). If a wakeup situation does not occur until 30 seconds have passed after <P0 OFF mode> begins (operation 806), <P1 mode> as a power-saving mode subordinate to <P0 OFF mode> begins (operation 808). On the other hand, if a wakeup situation occurs before 30 seconds have passed in <P0 OFF mode>, the control method proceeds to the print operation 802 after warm-up 810, or returns to <P0 mode> as a super-ordinate power-saving mode. If a wakeup situation does not occur until 10 seconds have passed after <P1 mode> begins, <P2 mode> as a power-saving mode subordinate to <P1 mode> begins. On the other hand, if a wakeup situation to begin a print operation occurs before 10 seconds have passed in <P1 mode>, the control method proceeds to the print operation 802 after <P0 OFF mode> 806 and warm-up 810. If a wakeup situation does not occur, <P2 mode> is maintained (812) because <P2 mode> is the lowest subordinate power-saving mode. Upon generation of the wakeup situation after <P2 mode> begins, whether or not an error occurs is checked (814). If no error occurs ('NO' of operation 814), the control method returns to <P1 mode> as a super-ordinate power-saving mode.

Figure 9:
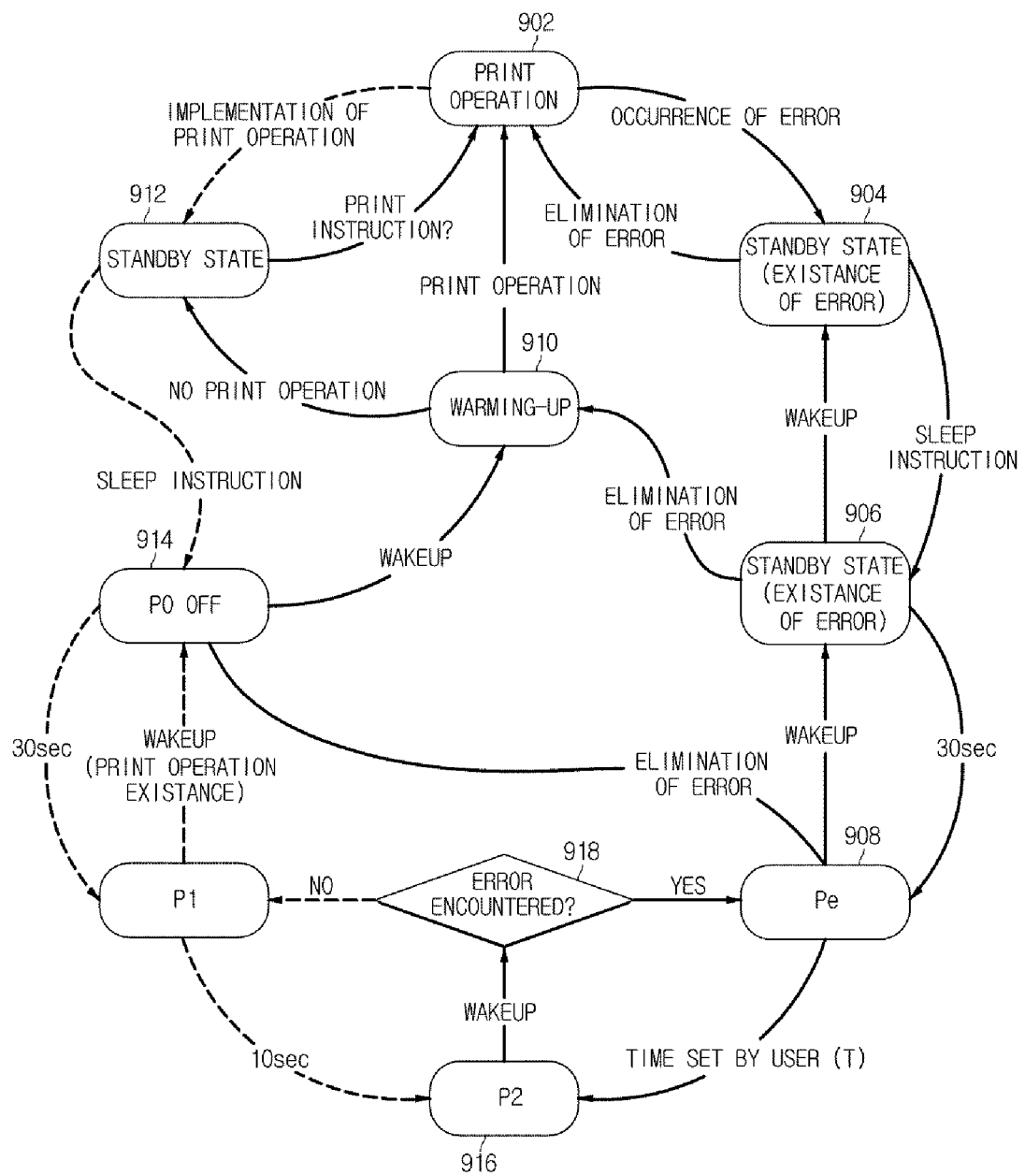
FIG. 9 illustrates a control method, distinguished by solid lines, in a case in which an error occurs after an operation instruction is generated.

FIG. 9 illustrates the control method of FIG. 7, distinguished by solid lines, in a case in which an error occurs after an operation instruction is generated. In FIG. 9, the control method in the case in which an error occurs or no error occurs when no operation instruction is generated is illustrated by dashed lines. As exemplarily illustrated in FIG. 9 by a solid line, if an error occurs during a print operation (operation 902), <P0 mode> as a standby state begins (operation 904). In this case, the maximum maintenance time of <P0 mode> is T/3 shorter than the maximum maintenance time T of <P0 mode> described with regard to FIG. 8. If a preset time T/3 has passed after <P0 mode> begins in a state in which an error is not yet resolved, a sleep instruction is generated to begin <P0 OFF mode> as a power-saving mode (operation 906). If a wakeup situation does not occur until 30 seconds have passed after <P0 OFF mode> begins, <Pe mode>, which is a power-saving mode subordinate to <P0 OFF mode> and serves to effectively resolve an error, begins (operation 908). On the other hand, if a wakeup situation occurs before 30 seconds have passed in <P0 OFF mode>, <P0 mode> as a super-ordinate mode begins. If the error is resolved before 30 seconds have passed in <P0 OFF mode>, the control method proceeds to the print operation 902 after warm-up 910 (under the assumption that a print operation is implemented), or returns to <P0 mode> as a super-ordinate mode (under the assumption that no print operation is implemented) (operation 912). If a wakeup situation does not occur until time T set by the user has passed after <Pe mode> begins, <P2 mode> as a subordinate power-saving mode to <Pe mode> begins. On the other hand, if an error is resolved before the time T set by the user has passed in <P1 mode>, the control method proceeds to the print operation 902 after <P0 OFF mode> 914 and warm-up 910. If a wakeup situation does not occur, <P2 mode> is maintained because <P2 mode> is the lowest subordinate power-saving mode (operation 916). Upon generation of the wakeup situation after <P2 mode> begins, whether or not an error occurs is checked (operation 918). If an error remains ("YES"" of operation 918), the control method returns to <Pe mode> as a super-ordinate power-saving mode. If no error remains ("NO"" of operation 918), the control method returns to <P1 mode> as described above in FIG. 8.

As is apparent from the above description, according to an aspect, as a result of appropriately managing a plurality of power-saving modes providing different power-saving effects in consideration of a situation, it may be possible to prevent time, taken for warming-up upon occurrence of a wakeup situation, from being unnecessarily increased.

According to an aspect, as a result of managing a power-saving mode upon occurrence of an error in consideration of display of the error as well as resolution to the error, it may be possible to allow a user to easily recognize occurrence of an error and to rapidly deal with the error.

According to an aspect, it may be possible to prevent frequent warming-up depending on frequent wakeup, and consequently to achieve enhanced power-saving efficiency and extended device lifespan.

Although the embodiments have been illustrated and described, it would be appreciated by those skilled in the art that changes may be made in these embodiments without departing from the principles and spirit of the invention, the scope of which is defined in the claims and their equivalents.

What is claimed is:

1. A method of controlling power-saving modes of an image forming apparatus, the method comprising:
   providing power to the image forming apparatus;
   determining if a print operation of the image forming apparatus is implemented and if an error occurs;
   beginning a first power-saving mode after standing by in a normal mode for a first length of time that is determined by a user setting of the image forming apparatus, if no print operation is determined as being implemented regardless of the determination of an error occurrence;
   beginning the first power-saving mode after standing by in the normal mode for a second length of time, if an error is determined as occurring during the implementation of the print operation;
   beginning a second power-saving mode, if the error determined as occurring during the implementation of the print operation is not resolved before a third length of time has passed; and
   beginning a third power saving mode, if a wake-up situation is not determined to occur before a fourth length of time has passed and if the error determined as occurring during implementation of the print operation is not resolved before the fourth length of time has passed,
   wherein the second length of time is preset to be shorter than the first length of time that is determined by the user setting, the second power-saving mode includes an error checking mode, and the fourth length of time is determined by the user setting.

2. The method according to claim 1, wherein the error-checking mode and the plurality of power-saving modes sequentially begin starting from a lower power-saving efficiency.

3. The method according to claim 1, wherein the second length of time is determined by reducing the first length of time by a preset rate.

4. The method according to claim 1, wherein the second length of time is one third the first length of time.

5. The method according to claim 1, wherein the image forming apparatus is switched to a state in which the error is checkable and information regarding the error is displayable in the error-checking mode.

6. The method according to claim 5, wherein performance of a Central Processing Unit (CPU) of the image forming apparatus is partially activated to check the error in the error-checking mode.

7. The method according to claim 5, wherein a display unit is activated to display information regarding the error in the error-checking mode.

8. The method according to claim 5, wherein among input/output pads of a Central Processing Unit CPU of the image forming apparatus, other input/output pads except for an input/output pad related to a constituent element at which the error occurs are turned off in the error-checking mode.

9. A method of controlling power-saving modes of an image forming apparatus, the method comprising:
providing power to the image forming apparatus;
determining if a print operation in the image forming apparatus is implemented and if an error occurs;
beginning a first of a plurality of power-saving modes having different power-saving efficiencies starting from a lower power-saving efficiency and switching to a higher power-savings efficiency after standing by in a normal mode for a first length of time that is determined by a user setting of the image forming apparatus, if no print operation is determined as being implemented regardless of the determination of an error occurrence; and
beginning the first of the plurality of power-saving modes after standing by in the normal mode for a second length of time, if an error is determined as occurring during implementation of a print operation, and beginning a second of the plurality of power-saving modes if the error determined as occurring is not resolved before a third length of time has passed,
beginning a third power saving mode, if at least one of a wake-up situation is not determined to occur before a fourth length of time has passed and if the error determined as occurring during implementation of the print operation is not resolved before the fourth length of time has passed,
wherein the second length of time is preset to be shorter than the first length of time that is determined to be set by the user,
the plurality of power-saving modes includes an error-checking mode, and the fourth length of time is determined by the user setting.

10. The method according to claim 9, wherein the second length of time is acquired by reducing the first time by a preset rate.

11. The method according to claim 9, wherein the second length of time is one third the first length of time.

12. The method according to claim 9, wherein the image forming apparatus is switched to a state in which the error is checkable and information regarding the error is displayable in the error-checking mode.

13. The method according to claim 12, wherein performance of a Central Processing Unit (CPU) of the image forming apparatus is partially activated to check the error in the error-checking mode.

14. The method according to claim 12, wherein a display unit is activated to display information regarding the error in the error-checking mode.

15. The method according to claim 12, wherein among input/output pads of a Central Processing Unit (CPU) of the image forming apparatus, other input/output pads except for an input/output pad related to a constituent element at which the error occurs are turned off in the error-checking mode.

16. A method of controlling power-saving modes of an image forming apparatus, the method comprising:
providing power to the image forming apparatus;
determining if a print operation in the image forming apparatus is implemented and if an error occurs;
beginning a first of a plurality of power-saving modes having different power-saving efficiencies starting from a lower power-saving efficiency after standing by in a normal mode for a first length of time that is determined by a setting of a user of the image forming apparatus, if no print operation is determined as being implemented regardless of the determination of an error occurrence;
beginning the first of the plurality of power-saving mode to switch the image forming apparatus to a state in which an error is checkable and information regarding the checked error is displayable after standing by in the normal mode for a second length of time, if an error is determined as occurring during the implementation of a print operation; and
beginning a second power-saving mode, if the error determined as occurring is not resolved before a third length of time has passed,
beginning a third power saving mode, if at least one of a wake-up situation is not determined to occur before a fourth length of time has passed and if the error determined as occurring during implementation of the print operation is not resolved before the fourth length of time has passed,
wherein the second length of time is preset to be shorter than the first length of time that is determined to be set by the user, and the fourth length of time is determined by the user setting.

17. The method according to claim 16, wherein a display unit is activated to display information regarding the error in the power-saving mode.

18. The method according to claim 16, wherein among input/output pads of a Central Processing Unit (CPU) of the image forming apparatus, other input/output pads except for an input/output pad related to a constituent element at which the error occurs are turned off in the power-saving mode.

19. The method according to claim 16, wherein the second length of time is acquired by reducing the first length of time by a preset rate.

20. The method according to claim 16, wherein the second length of time is one third the first length of time.

21. A method of controlling power-saving modes of an image forming apparatus, the method comprising:
providing power to the image forming apparatus;
determining if a print operation in the image forming apparatus is implemented and if an error occurs;

beginning a first power-saving mode after standing by in a normal mode for a first length of time that is determined by a setting of a user of the image forming apparatus, if no print operation is determined as being implemented regardless of the determination of an error occurrence;

beginning the first power-saving mode after standing by in the normal mode for a second length of time if an error is determined as occurring during implementation of a print operation;

beginning a second power-saving mode, if the error determined as occurring during implementation of the print operation is not resolved before a third length of time has passed; and beginning a third power saving mode, if a wake-up situation is not determined to occur before a fourth length of time has passed and if the error determined as occurring during implementation of the print operation is not resolved before the fourth length of time has passed, wherein the second length of time is shorter than the first time that is set by the user, and the fourth length of time is determined by the user setting.

22. The method according to claim 21, wherein the second time is determined by reducing the first time by a preset rate.

23. The method according to claim 21, wherein the second length of time is one third the first length of time.

24. The method according to claim 1, wherein the third length of time is determined by the user setting.

* * * * *